United States Patent
Richards et al.

(10) Patent No.: US 7,841,185 B2
(45) Date of Patent: Nov. 30, 2010

(54) TURBINE ENGINE AND A METHOD OF OPERATING A TURBINE ENGINE

(75) Inventors: Martyn Richards, Burton-upon-Trent (GB); Nicholas Howarth, Derby (GB)

(73) Assignee: Rolls-Royce plc, London (GB)

( * ) Notice: Subject to any disclaimer, the term of this patent is extended or adjusted under 35 U.S.C. 154(b) by 565 days.

(21) Appl. No.: 11/353,097

(22) Filed: Feb. 14, 2006

(65) Prior Publication Data

US 2006/0196192 A1 Sep. 7, 2006

(30) Foreign Application Priority Data

Mar. 2, 2005 (GB) ................... 0504272.6

(51) Int. Cl.
*F02C 6/08* (2006.01)
(52) U.S. Cl. .......................... 60/782; 60/785
(58) Field of Classification Search ............... 60/772, 60/782, 785, 795
See application file for complete search history.

(56) References Cited

U.S. PATENT DOCUMENTS

| | | | | |
|---|---|---|---|---|
| 2,990,905 A | * | 7/1961 | Lilley | 181/220 |
| 3,070,131 A | * | 12/1962 | Wheatley | 138/115 |
| 3,398,896 A | | 8/1968 | Rabone | |
| 3,641,766 A | * | 2/1972 | Uehling | 60/262 |
| 4,551,972 A | * | 11/1985 | Lewis | 60/39.281 |
| 5,184,461 A | | 2/1993 | Stransky | |
| 5,235,808 A | * | 8/1993 | Taylor | 60/771 |
| 5,485,717 A | * | 1/1996 | Williams | 60/773 |
| 5,706,651 A | | 1/1998 | Lillibridge | |
| 6,308,898 B1 | * | 10/2001 | Dorris et al. | 239/265.17 |
| 2001/0039794 A1 | * | 11/2001 | Rocklin et al. | 60/39.05 |

FOREIGN PATENT DOCUMENTS

| | | |
|---|---|---|
| GB | 0 948 571 SP | 2/1964 |
| GB | 2 207 468 A | 2/1989 |
| GB | 2 377 973 A | 1/2003 |

* cited by examiner

*Primary Examiner*—Michael Cuff
*Assistant Examiner*—Andrew Nguyen
(74) *Attorney, Agent, or Firm*—Jeffrey S. Melcher; Manelli Denison & Selter PLLC

(57) ABSTRACT

Disparities between optimum engine thrust for aircraft operation and power necessary to drive an ancillary machine such an electrical power generator can cause problems within a turbine engine. Clearly, it is necessary to continue developing sufficient electrical power for control and other systems within an aircraft despite aircraft thrust requirements. Previously, some compressed air flow has been bypassed in order to maintain compressor stability, but unfortunately such bypass systems within turbine engines can have a thrust recovery regime such that there is excess thrust in comparison with that actually necessary. In accordance with the present invention, a proportion of the compressed air flow is bled directly through a bleed path to an exhaust nozzle 104 of an engine such that the compressor core can continue to provide work to drive an ancillary machine whilst engine thrust is limited to that actually required, achieving a significant saving in terms of fuel consumption and wear and tear upon brakes, etc under low power operation.

12 Claims, 2 Drawing Sheets

TURBINE ENGINE AND A METHOD OF OPERATING A TURBINE ENGINE

FIELD OF THE INVENTION

The present invention relates to turbine engines and in particular turbine engines where that engine provides driving work to an ancillary machine as well as thrust.

BACKGROUND OF THE INVENTION

Operation of turbine engines is well known. Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produces two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

In the above circumstances it will be appreciated that there is a general air flow through the engine 10. It will also be understood that turbine engines 10 can be utilised in order to provide electrical power through a generator typically driven by a coupling to the compressor/turbine spool. In short through that coupling which will generally also incorporate a gear box, an electrical generator is driven in order to provide electrical power for an aircraft.

Clearly, there may be differences in the demand for electrical power and the demand for engine thrust. Traditionally, this divergence has been accommodated through dumping compressor airflow to the engine bypass and so does not necessarily result in a reduction in thrust by the engine. It will be understood that in addition to considering the thrust requirements as well as electrical power demand, it is also necessary to ensure that compressor stability is maintained. As indicated previously, traditionally compressor stability has been maintained by bleeding air into the bypass but with thrust recovery. Unfortunately, in situations where thrust recovery is not required, for example during descent or ground idle, the excess thrust can result in a longer descent than desirable or excess wheel brake wear on the ground.

In such circumstances it will be desirable to maintain compressor stability under reduced thrust load whilst still maintaining sufficient work capacity in order to drive such auxiliary machines as electrical power generators.

SUMMARY OF THE INVENTION

In accordance with the present invention, there is provided a turbine engine comprising a compressor, turbine and an exhaust nozzle, the turbine providing additional work to drive an ancillary machine, a bleed path is associated with the compressor whereby a proportion of the compressed air is removed from the compressed airflow for engine operation, the engine characterised in that the bleed path associated with the compressor allows a proportion of the compressed air flow to be lost directly to the exhaust nozzle downstream of a final turbine whereby the work provided to drive the ancillary machine can be maintained when less compressed air is required for engine thrust operation.

Also, in accordance with the present invention there is provided a method of operating a turbine engine including a compressor stage and exhaust nozzle, the method including the steps of generating a compressed airflow for engine operation and providing work to drive an ancillary machine, monitoring engine requirements and bleeding a proportion of the compressed air from the compressor, the method characterised in that the proportion of compressed air is lost directly to the exhaust nozzle whereby the work provided to the ancillary machine can be maintained whilst less compressed air is required for engine operation.

Typically, the proportion of compressed air lost is 20% of the compressed air flow. However, this could be up to 50% of the compressed air flow.

Generally, the bleed path comprises a circumferential manifold or gallery for extraction of the proportion of compressed air appropriately downstream of the compressor. Typically, the manifold or gallery incorporates spaced sink apertures leading to the bleed path.

Generally, the bleed path leads to a circumferential outlet for desired injection into the exhaust gas flow through the exhaust nozzle. Normally, the desired injection is in order to adjust cross flow turbulence into that exhaust gas flow. Possibly, the desired injection provides for entrainment of the exhaust gas flow as a core within injected compressed air from the bleed path as acoustic shielding for that exhaust gas flow.

Possibly, the bleed path has a control valve to vary the proportion of compressed air lost directly to the exhaust nozzle.

Possibly, the proportion of the compressed air removed is to avoid excess thrust to allow a fuel flow reduction for a more desirable thrust to fuel flow relationship during engine operation.

Further in accordance with the present invention there is provided a bleed path for a turbine engine, the bleed path directly coupling a compressor with an exhaust nozzle in order that a proportion of a compressed air flow from the compressor is lost directly to that exhaust nozzle.

BRIEF DESCRIPTION OF THE DRAWINGS

An embodiment of the present invention will now be described by way of example and with reference to the accompanying drawings in which.

DETAILED DESCRIPTION OF THE INVENTION

In accordance with the present invention, bleed air taken from the compressor is re-injected into the exhaust nozzle rearward of the final turbine stages of a turbine engine. Thus, by direct loss of the bleed air from the compressor, there is a thrust reduction whilst maintaining compressor stability for providing work to drive ancillary machines such as an electrical power generator. By varying the degree of bleed air it is possible to reconcile the potentially differing requirements for thrust in comparison with necessary electrical power generation. Such reconciliation allows for increased operational flexibility, improved fuel burn for higher efficiency operation, and in view of the lower thrust, reduced brake wear on landing by an aircraft propelled by the turbine engine. It will be understood that using bleed air flow to reduce thrust is generally considered counter intuitive as it is normal to bleed to a bypass to recover thrust rather than lose thrust.

In addition to using this invention to remove excess thrust it is also feasible to realise fuel flow reduction because of the consequential shift of the engine onto a more favourable thrust/fuel flow relationship at very low/negative thrusts.

As will be appreciated as more and more electronic controls and other service provisions such as air conditioning are provided, there is a higher demand for electrical power. Thus, when engine throttle settings are at pinch points such as the start of descent, it will be appreciated that such high electrical power demand will dictate a higher level of engine thrust than normally required for simple aircraft propulsion. As indicated previously, it is known to provide a compressor bleed to the engines bypass, but the associated thrust recovery for efficiency in such conventional bypass flows means that excess thrust is maintained. In short it will be desirable to simply lose a proportion of the compressed air flow, which although appearing as an apparent loss situation allows overall more efficient operation of the engine. In short, it is desirable during low power, descent or ground idle conditions of the engine to ensure that excess thrust, which in such conditions is a major disadvantage, is reduced or avoided.

The present invention as indicated reconciles the differing requirements for electrical power generation or driving of other ancillary apparatus with differing engine thrust necessities. In such circumstances upon determination of an appropriate condition, bleed air from the compressor system is redirected via a valve control device to an exhaust nozzle downstream of the final engine turbine. This direct loss of a proportion of the compressed air flow has the effect of reducing the final or low pressure turbine work and hence fan, which in turn reduces the cold stream thrust in a normal turbine bypass engine.

Figure 1:
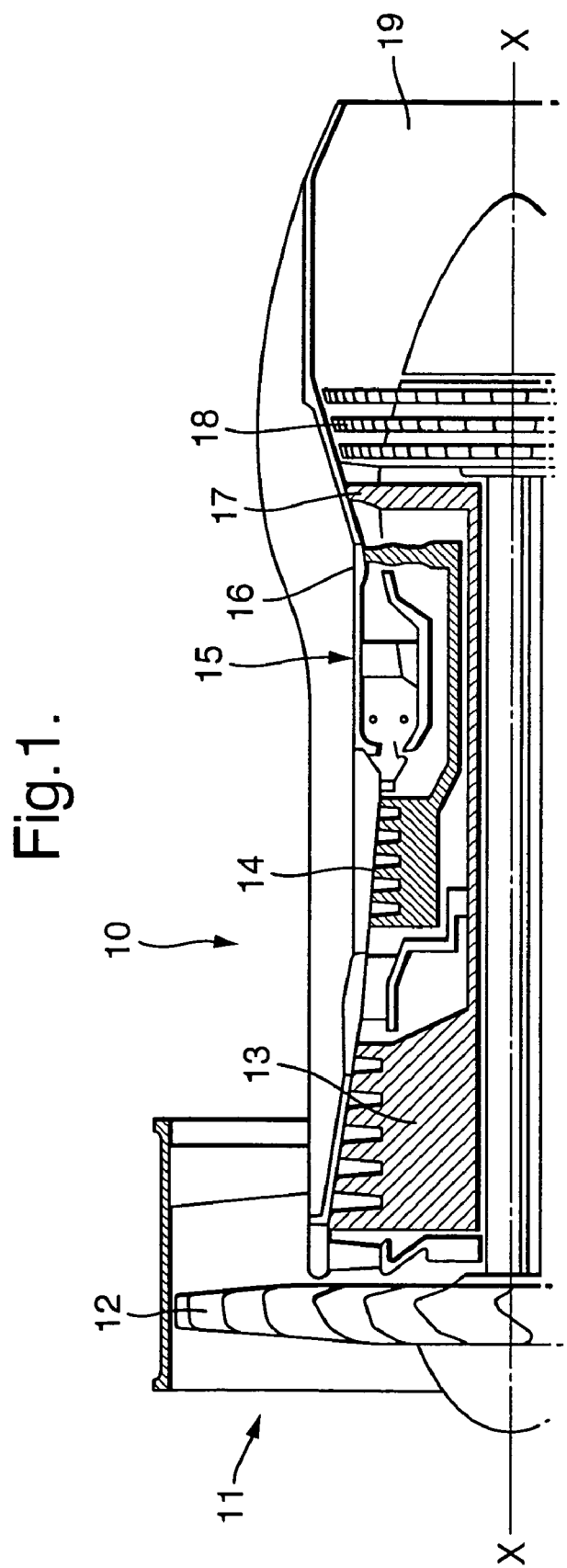
FIG. 1 is a diagrammatic cross-sectional view of a gas turbine engine.
Figure 2:
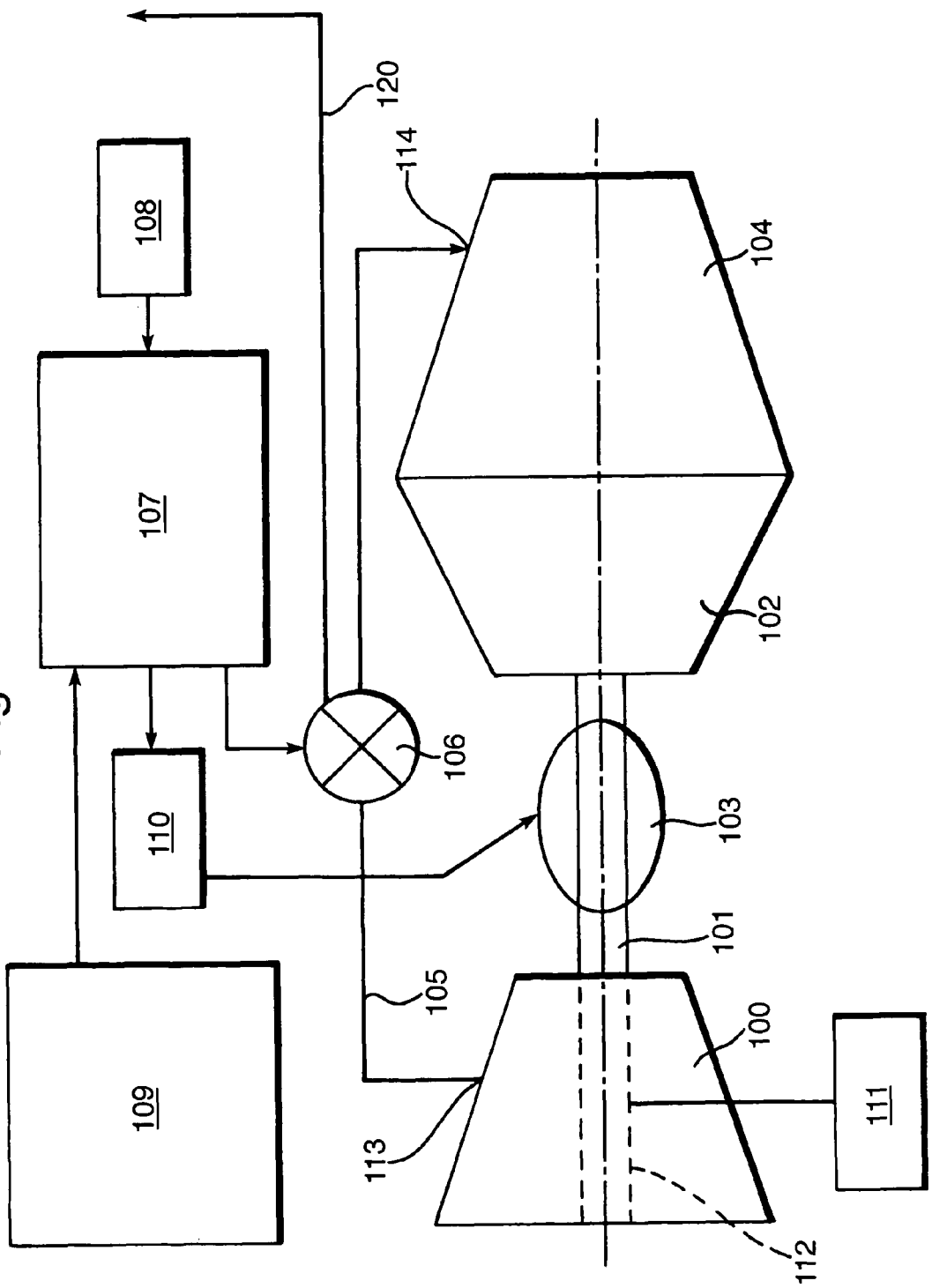
FIG. 2 is a schematic depiction of a turbine engine in accordance with the present invention.

FIG. 2 provides a schematic illustration of the various inputs which may be used with respect to the provision of the present invention. Mechanically, compressor stages 100 are coupled through a shaft 101 to turbine stages 102. Between the compressor stages 100 and turbine stages 102, a combustor 103 is provided, which in accordance with known turbine engine technology develops thrust via the exhaust nozzle(s) 104. As the gases enter the nozzle they expand rapidly to produce thrust. This expansion forces against the exhaust nozzle to produce the thrust. In accordance with the present invention a bleed path 105 is provided from a compressor stage directly to the exhaust nozzle 104 after the final turbine of the turbine stages 102. In accordance with the invention, a control valve 106 is provided to control the proportion of compressed air flow from the compressor stages 100 which is directly passed to the exhaust nozzle 104.

In determining operation and degree of opening of the control valve 106, a controller 107 receives signals indicative of engine data 108 from conventional engine controls as well as aircraft performance data 109 indicative of aeronautical information such as air speed, vertical speed indicated, ground speed, possibly with reference to global positioning systems and when on the ground an indication as to brake temperature, ground taxi speed of an aircraft incorporating the engine, etc. The controller 107 could resolve ground speed, flight speed and air speed to operational best advantage, that is to say increased negative thrust to allow steeper descent to reduce altitude in a given horizontal constraint and provide a control signal to a fuel flow throttle 110 which in turn adjusts the rate of fuel flow as well as possibly other factors in the combustor 103 in order to adjust engine thrust dependent upon the controller 107 determination as to necessary engine thrust performance.

Additionally, a path 120 is provided to a conventional bleed exhaust. In such circumstances, it is possible to recover thrust/minimise fuel burn at higher thrust demand such as with an aircraft engine during final approach to land when after final descent the engines are powered up for a short time just before landing.

In accordance with the present invention the controller 107 will also send a control signal to the control valve 106 in order to adjust and open the bleed path 105 between the compressor stages 100 and the exhaust nozzle 104.

As indicated above, an ancillary machine such as an electrical power generator 111 will be driven by work taken from a compressor core shaft 112. Thus, in order to maintain that work to drive the generator 111, the controller 107 will resolve the necessary engine thrust for aircraft operation in terms of fuel flow, etc into the combustor 103 as well as determine the proportion of compressed air from the compressor stages 100 which is bled directly to the exhaust nozzle 104. Such determination is as indicated above through opening and closing the control valve 106. Clearly, the control valve 106 may be a simple butterfly valve or the control valve 106 may be progressively opened depending upon bleed flow requirements.

It will be appreciated in bleeding the air flow through the bleed path 105 it is desirable to disturb the compressed air flow as little as possible as it is bled through the bleed path 105. In such circumstances, typically a circumferential manifold or gallery will be provided at an inlet 113 such that air flow is taken in a balanced manner across the flow without inducing turbulence in the compressed air flow directed towards the combustor 103. Typically, for convenience within this gallery or manifold, a number of radially spaced sink apertures will be provided, which in view of differing cross sectional area, etc will achieve an approximately equivalent pressure drop across the gallery throughout the circumference of the manifold/gallery for avoiding turbulence, etc.

At the ejector part 114 of the bleed path 105, consideration will again be taken with respect to how the bled proportion of the compressed air flow is injected into the exhaust gas flow from the engine. Generally, that injected bleed flow should have limited cross turbulence effect upon the exhaust flow from the engine, however to spoil excess thrust it may be advantageous to introduce turbulence to further reduce final turbine expansion rates by increasing the non-dimensional flow in the nozzle Advantageously, the injected bleed flow may be used to surround the exhaust gas flow in order to supplement existent acoustic shielding flows to limit engine noise problems. A balanced degree of turbulence and injection configuration could be used in a practical realisation of the invention.

In terms of the control regime utilised with respect to the present invention, it will be appreciated that parameters which are already monitored for engine performance and avionics may be utilised in order to determine the control valve 106 setting, whether it be simple open/close or proportional, necessary to reconcile engine thrust requirements with the necessity to provide work for driving an ancillary machine such as an electrical power generator. In such circumstances, an existing turbine engine may be adapted in accordance with the present invention by provision of a specific bleed path between the compressor stages 100 and the exhaust nozzle 104 with a control valve in that bleed path, itself controlled by the controller 107 in order to determine necessary variation of the bleed path for operational performance reconciliation between compressed air flow for combustor 103 operation and therefore engine thrust with providing work for driving an ancillary machine such as an electrical power generator.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of providing propulsive thrust to an aircraft from a gas turbine engine comprising, in axial flow series:
   a propulsive fan;
   a compressor;
   a combustor;
   a turbine;
   a final turbine, wherein said propulsive fan produces, during use, a first air flow passing into said compressor and a second air flow which provides propulsive thrust, and wherein said compressor is driven by said turbine via a compressor core shaft and said propulsive fan is driven by said final turbine via a shaft; and
   an exhaust nozzle through which hot combustion gases are exhausted to provide additional propulsive thrust,
   the method comprising:
   operating the gas turbine engine to produce a first propulsive thrust;
   driving an electrical generator by work taken from the compressor core shaft;
   bleeding compressed air from the compressor to the exhaust nozzle to provide a reduced propulsive thrust, provided by reducing said second air flow being delivered from said propulsive fan, and maintain the work; and
   using a controller to determine a proportion of compressed air to bleed to provide the reduced propulsive thrust and maintain the work.

2. A method according to claim 1, wherein method comprises the step of bleeding the compressor during any one of the engine descent, ground idle and lower thrust conditions.

3. A method according to claim 1, wherein the engine comprises a control valve provided to control the proportion of compressed air bled from the compressor.

4. A method of providing propulsive thrust to an aircraft from a gas turbine engine comprising, in axial flow series:
   a propulsive fan;
   a compressor;
   a combustor;
   a turbine;
   a final turbine, wherein said propulsive fan produces, during use, a first air flow passing into said compressor and a second air flow which provides propulsive thrust, and wherein said compressor is driven by said turbine via a compressor core shaft and said propulsive fan is driven by said final turbine via a shaft; and
   an exhaust nozzle through which hot combustion gases are exhausted to provide additional propulsive thrust,
   the method comprising:
   operating the gas turbine engine to produce a first propulsive thrust;
   driving an electrical generator by work taken from the compressor core shaft;
   bleeding compressed air from the compressor to the exhaust nozzle to provide a reduced propulsive thrust, provided by reducing said second air flow being delivered from said propulsive fan, during any one or more of descent, approach or landing of the aircraft or idling of the engine and maintain the work; and
   using a controller to determine an amount of reduced fuel flow to the combustor and determine a proportion of compressed air to bleed to provide the reduced propulsive thrust and maintain the work.

5. A method of providing propulsive thrust to an aircraft from a gas turbine engine comprising, in axial flow series:
   a propulsive fan;
   a compressor;
   a combustor;
   a turbine;
   a final turbine, wherein said propulsive fan produces, during use, a first air flow passing into said compressor and a second air flow which provides propulsive thrust, and wherein said compressor is driven by said turbine via a compressor core shaft and said propulsive fan is driven by said final turbine via a shaft; and
   an exhaust nozzle through which hot combustion gases are exhausted to provide additional propulsive thrust,
   the method comprising:
   operating the gas turbine engine to produce a first propulsive thrust;
   driving an electrical generator by work taken from the compressor core shaft;
   bleeding compressed air from the compressor to the exhaust nozzle to provide a reduced propulsive thrust, provided by reducing said second air flow being delivered from said propulsive fan, and maintain the work; and
   using a controller to determine an amount of fuel flow to the combustor and determine a proportion of compressed air to bleed to provide the reduced propulsive thrust and maintain the work.

6. A method according to claim 5, wherein the reduced propulsive thrust is provided during idle or any one or more of descent, approach or landing of the aircraft.

7. A method according to claim 1, wherein the controller receives signals indicative of air speed, ground speed, and vertical speed of the aircraft and adjusts a fuel flow to the combustor and determines a proportion of air to bleed based on the input of the signals.

8. A method according to claim 1, wherein the controller receives signals indicative of air speed, ground speed, and vertical speed of the aircraft and adjusts a fuel flow to the combustor and determines a proportion of air to bleed based on the input of the signals to both maintain the work capacity and provide a steeper descent to reduce altitude in a given horizontal constraint.

9. A method according to claim 4, wherein the controller receives signals indicative of air speed, ground speed, and vertical speed of the aircraft and adjusts the fuel flow to the combustor and determines a proportion of air to bleed based on the input of the signals.

10. A method according to claim 4, wherein the controller receives signals indicative of air speed, ground speed, and vertical speed of the aircraft and adjusts the fuel flow to the combustor and determines a proportion of air to bleed based on the input of the signals to both maintain the work capacity and provide a steeper descent to reduce altitude in a given horizontal constraint.

11. A method according to claim 5, wherein the controller receives signals indicative of air speed, ground speed, and vertical speed of the aircraft and adjusts the fuel flow to the combustor and determines a proportion of air to bleed based on the input of the signals.

12. A method according to claim 5, wherein the controller receives signals indicative of air speed, ground speed, and vertical speed of the aircraft and adjusts the fuel flow to the combustor and determines a proportion of air to bleed based on the input of the signals to both maintain the work capacity and provide a steeper descent to reduce altitude in a given horizontal constraint.

* * * * *